United States Patent Office 3,352,804
Patented Nov. 14, 1967

3,352,804
PENTAERYTHRITOL MODIFIED EPOXY RESINS
Jack Blatchley Harrison, Leslie Donald Hignett and James Keith Gentles, Liverpool, England, assignors to Goodlass Wall & Co. Limited, Liverpool, England, a British company
No Drawing. Continuation of application Ser. No. 179,490, Mar. 13, 1962. This application May 19, 1966, Ser. No. 551,467
Claims priority, application Great Britain, Mar. 15, 1961, 9,451/61
11 Claims. (Cl. 260—18)

This application is a continuation of S.N. 179,490 filed Mar. 13, 1962, now abandoned.

The present invention relates to modified epoxide resins. More particularly the present invention relates to epoxide resins modified with pentaerythritol and cross-linked products thereof with polyamines, polyamides or polyisocyanates.

Epoxide resins are well known to the art. Whilst the term "epoxide" is generic to resins containing epoxide groups it generally refers to the class of epoxide resins which are polyether derivatives of polyhydric phenols obtained by the interaction of the said polyhydric phenol with epichlorhydrin. The most common epoxide resins in general use are those obtained by the interaction of diphenylolpropane (p,p'-dihydroxy - diphenyl dimethylmethane) and epichlorhydrin under alkaline conditions. It is with this class of epoxide resin that the present invention is primarily concerned.

As a class these are linear polyethers with terminal epoxide groups and hence their molecular size may be conveniently indicated by the epoxide equivalent thereof. This is defined as the grams of resin containing 1 gram equivalent of epoxide. Each dihydroxyphenol/epichlorhydrin unit in the polymer chain also contains 1 hydroxyl group, for example:

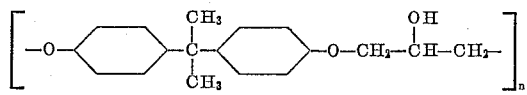

where $n$ is an integer indicating the degree of polymerisation. Similarly the hydroxyl equivalent of the resin is defined as the grams of resin containing 1 gram equivalent of hydroxide.

Typical resins of this type are the Epikote or Epon resins which have the formula

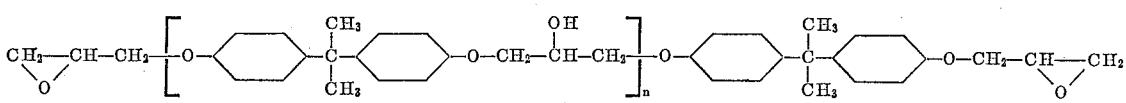

where $n$ is the degree of polymerisation preferably equal to 1 or 2. A typical resin is one having an epoxide equivalent of 190–210, specifically Epikote (registered trademark) resin No. 828 of characteristics as follows:

Melting point, ° C. _____ 8–12
Viscosity, poises _____ 98.5–148.0

These epoxide resins due to their reactive terminal epoxide groups can be reacted with polyamines or polyamides to give highly condensed non-thermo-plastic polymers with outstanding alkali solvent and chemical resistance. The low molecular weight products are compounded with the requisite curing agents in the absence of solvent and form the basis of casting resin applications. In the surface coating field they possess a serious disadvantage, in that after exposure to an aqueous environment, they rapidly lose adhesion to the substrate to which they are applied. This defect is most marked in the case of amine cured systems and whilst improved in polyamide cured systems it is still below the standard of adhesion required for permanency of performance in use.

The present invention provides a modified epoxy resin and process for the production thereof which when cured with polyamines, polyamides and polyisocyanates give coatings which have much greater adherence to their substrate and at the same time in many cases give better water resistance.

The present invention provides a modified epoxy resin which when substituted for the unmodified epoxy resins as aforesaid and cured with polyamines, polyamides or polyisocyanates give coatings which have much greater adherence to their substrate while maintaining and in many cases improving particularly with respect to the polyamide and polyisocyanate cured systems, their other properties of water and chemical resistance.

Accordingly the present invention provides a process for the preparation of modified epoxide resins which comprises heating an epoxide resin of epoxide equivalent below 400 and preferably from 190 to 210 and having terminal epoxy groups, with pentaerythritol in proportions such that there are at least two epoxide groups for each hydroxyl group of the pentaerythritol to a temperature of from 180 to 230° C., for at least 5 hours and cooling the product so formed.

The completion of reaction is indicated by a markedly increased viscosity and tremendously increased melting point. The present invention also relates to the modified epoxy resin produced by said process.

It is though that one of the epoxide groups of the epoxy resin molecule reacts with a hydroxyl group in the pentaerythritol:

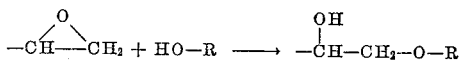

so that the end product, i.e., the modified epoxide resin, theoretically has a structure:

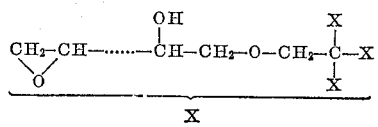

This product is a chemical entity, is thermoplastic and has a well defined melting point. However, as with chemical processes in general complete reaction does not usually take place but it is found that normally an average of at least three hydroxyl groups of the pentaerythritol are condensed with epoxide groups of the epoxy resin molecules by the process of the present invention.

The present invention therefore also provides a modified epoxy resin which is a condensation product of penaterythritol and an epoxy resin having terminal epoxy groups and an epoxy equivalent below 400 in proportion such that there are at least two epoxy groups for each hydroxyl group of the pentaerythritol, said modified resin having an epoxy equivalent not in excess of 850 and a hydroxyl number not in excess of 240.

Preferably the modified resin has an epoxy equivalent in the range 400 to 450 and more preferably in the range 415 to 430. Desirably the modified resin has a hydroxyl equivalent in the range 210 to 240.

The reaction preferably takes place over 12 to 14 hours.

During reaction, the viscosity of the reactant mixture slowly rises and if the reaction is continued, the system will gell. The fact that gelation does ultimately result must mean that, either the starting resin is not solely a diepoxide and in fact contains traces of high polyepoxides, or alternatively there is some interaction between the epoxide groups and hydroxyl groups present in the epoxide resin. These are secondary hydroxyl groups and hence are less reactive than the primary hydroxyl groups of the pentaerythritol, but, due to the time of the process—approximately 12 hours—some such reaction of secondary hydroxyl groups can possibly take place.

The reaction mixture, which after the incorporation of the pentaerythritol over the first hour is a viscous liquid, gradually increases in viscosity, into a stage when the product is solid when cold and in fact the resin obtained just prior to gelation has a very high melting point of the order of 150° C.

It has been found that, by viscosity control, products can be selected with very repeatable properties, and the products of particular interest to this invention are those in the range 2 to 5 poises at 25° C. as 50% by weight solutions in Cellosolve (registered trademark). By experiments it has been found that products falling in the viscosity range 3.5 to 4.5 poises can be readily and repeatedly prepared. Such a product has the following analytical characteristics compared with the epoxy resins designated Epikote 828 and Epikote 1001 and Epikote 1004.

| Resin | Modified epoxide resin | Epikote 828 | Epikote 1001 | Epikote 1004 |
|---|---|---|---|---|
| M.P., ° C | 95–100 | Liquid | 64–76 | 95–105 |
| Epoxide equivalent | 420 | 190–210 | 450–525 | 875–1,075 |
| Equivalent weight [1] | 108 | 80 | 130 | 175 |
| Viscosity 50% in Cellosolve at 25° C. in poises | 3.5–4.5 | (²) | 1.5–2 | 4.4–6.27 |

[1] Grams resin required to completely esterify 1 gram mole of monobasic acid e.g., 280 grams of acid having 18 carbon atoms.
² About 0.1.

The invention seeks to obtain a resin having the maximum epoxy group and hydroxyl group functionality consistent with practicable products in use by the use of readily available materials. Pentaerythritol is clearly a desirable alcohol as representing a readily melting comparatively heat stable component with a functionality of 4 primary hydroxyl groups.

Higher functionality is possible with polypentaerythritols but their high melting point indeterminate composition and non-availability at an economic price together with the fact that they give rise to a reaction with epoxide which is hard to control limit their use.

Such polyalcohols as glycerol tri-methylolpropane and tri-methylolethane have only a functionality of 3 and are too heat-unstable under the conditions of the experiment. Glycols as a class do not offer any increase in epoxide functionality.

It is clear that the modified epoxy resins according to the invention have markedly increased functionality with respect to polyamines and polyamides, and that on comparison with, say, a commercial epoxide resin of similar molecular weight, e.g., Epikote 1004 (registered trademark), the modified epoxy resin of the invention has at least twice the epoxy functionality, i.e., a functionality of 4 as against 2.

The invention is also concerned with the reaction of the modified epoxide resin with polyamines and polyamides, and according to a further feature of the invention, the modified epoxide resin is reacted with a polyamine or a polyamide preferably in the weight ratios from 3:1 to 6:1.

The high functionality of the modified epoxide resins may be illustrated by the length of the pot life of 50% solutions of resin when mixed with polyamines and polyamides, tabulated below:

| Resin Systems | Modified Epoxide resin | Epoxy Resin Epikote 1004 (Reg. Trademark) |
|---|---|---|
| Amine adduct to resin weight ratio of 1 to 2 based on solid resins | 1–2 hours | Greater than 24 hours |
| Polyamide resin to resin weight ratio of 1 to 1 | 4–6 hours | Several days |
| Polyamide resin to Epoxy resin weight ratio 1 to 5 | 24 hours | Many days |

The products obtained have excellent retention of adhesion to any substrate after subjection to an aqueous environment, and at the same time the excellent solvent and alkali resistance characteristic of epoxide resins in general.

In the more recent field of epoxide resin/polyisocyanate systems the modified epoxide resins of this invention show to particular advantage. In this case it is not a question of the interaction of epoxy groups but of hydroxyl groups with the isocyanate groups. It is conventional practice to use the so-called isocyanate adducts as characterized by Desmodur L (a registered trademark) for a high molecular weight polyisocyanate formed by reacting tolylene diisocyanate and a trihydric alcohol. The reaction product contains only traces of the initial tolylene di-isocyanate. The —NCO content of a 75% solids solution is approximately 13. Desmodur L is described in the Farbenfabriken Bayer A.G. publication, "Desmodue/Desmophen for Polyurethane Coatings," dated January 11, 1961. In this field solvents free from hydroxyl groups must be employed and it is therefore necessary to use either ketonic or ester solvents.

The present invention therefore further provides a coating composition which comprises the aforesaid modified epoxy resins of the present invention in admixture with a polyamide, a polyamine or a polyisocyanate preferably in the ratio of from 3:1 to 6:1.

Preferably for convenience of handling the polyisocyanate preferably an aromatic polyisocyanate such as tolylene diisocyanate is in the form of an adduct with a phenol and the polyamine preferably an aliphatic polyamine such as ethylene diamine is in the form of an adduct with an epoxy resin.

The modified epoxide resins of the invention, when cured with Desmodur L, and exposed to aqueous environment, show unimpaired adhesion and solvent and aqueous resistance of an order not hitherto found. This excellent adhesion and resistance applies to a wide range of substrates, such as steel, copper, tin, brass, aluminium, glass, glazed tiles, hardboard, phenolic laminates and the finishes that can be prepared are of obvious high potential in the industrial and decorative finishing fields.

Such excellent adhesion has hitherto not been possible, from employment of conventional epoxide resins of the Epikote series or of their alkanolamine modifications.

Where the modified epoxide resins are cured with polyisocyanate, ester solvents are required to be used. The period of heating of the epoxide resin with the pentaerythritol must be at least 5 hours in order that the resultant modified epoxide resin may be completely soluble in Cellosolve acetate.

The invention is also concerned with the products resulting from the above mentioned reactions.

The invention will now be further described by way of the following examples.

*Example I*

1580 parts of Epikote 828 and 143 parts of pentaerythritol are charged into a stainless steel gas heated vessel provided with an agitator and with stirring the temperature is gradually raised to 220 to 225° C. and maintained at this temperature.

After 1 hour at this temperature the product when sampled and cooled gives a clear semi-solid resin, which gives a turbid solution in Cellosolve acetate. After 3 hours at this temperature a sample gives a clear solution in Cellosolve acetate and in a 50% solution in Cellosolve has a viscosity at 25° C. of 0.5 poises.

After 7 hours a sample in 50% solution in Cellosolve gives a viscosity of 1.25 poises at 25° C. and after 7¾ hours under similar conditions the viscosity has risen to 2.3 poises at 25° C.

After 8¼ hours when the viscosity of a 50% solution in Cellosolve is 3.2 at 25° C. the heating is stopped and the batch poured into a suitable tray and allowed to cool.

When cooled to room temperature the product resulting from the 8¼ hours heating has the following characteristics:

Melting point (Durran's method), ° C. _____ 95
Epoxide equivalent _____ 420
Hydroxyl value _____ 220
Viscosity of 50% solution in Cellosolve at 25° C., poises _____ 3.5

Example II

Araldite F is an epoxy resin which is similar in properties to Epikote 828 of Example I but which has a higher viscosity. The resins as supplied compare as follows:

|             | Viscosity, poises | Epoxide Eqt. |
|-------------|-------------------|--------------|
| Araldite F  | 200–400           | 187–200      |
| Epikote 828 | 100–160           | 175–210      |

Quantities used:                                  Gm.
    Araldite F _____ 1600
    Pentaerythritol _____ 136

This corresponds approximately to a ratio of epoxide groups to hydroxyl groups of the pentaerythritol of 2:1.

The reactants were charged into a stainless steel pot and heated with stirring until the temperature rose to 220° C. The temperature was maintained at this value for 8 hours with continuous stirring when a product was obtained which on cooling gave a solid resin of melting point 100° C. (Durran's method) and had a viscosity of 3 poises as a 50% solution in Cellosolve.

Basic values of condensate:
    Epoxide equivalent _____ 430
    Hydroxyl equivalent _____ 240

Properties nd performance of this condensate are equivalent to those of the Epikote 828/pentaerythritol condensate.

Example III

When a 50% solution of the product of Example I in Cellosolve is mixed with a 50% solution of a polyamide resin, having an amine value of 165–190 mgm. KOH/gm., dissolved in xylol in such proportions that the epoxide resin to said polyamide ratio by weight on a solid basis lies between 3:1 and 6:1, products with a pot life of 24 hours result, and when applied as thin films to steel give automatic curing at room temperature to a tough adhesive film. Alternatively, if after application the films are cured by heating at temperatures of the order of 120° C. for 30 minutes a hard very adherent film results. If desired the epoxide resin solution can be previously ground with pigments to give pigmented systems which on admixture with the said polyamide resin give similar curing characteristics to the clear varnish system. Both clear and pigmented systems when fully cured have excellent water, alkali, acid and solvent resistance. Even after prolonged exposure to aqueous environments they give unimpaired adhesion to the substrate.

In place of the product of Example I the product of Example II was used with similar results.

Example IV

Clear lacquers were made up containing ratios by weight of product of Example I to polyamide in the range 3:1 to 6:1 (a polyamide resin having an amine value of 165–190 mgm. KOH/gm.). On applying to steel substrates and allowing to air dry for a period of 3–7 days at 20° C. or longer, tough flexible films were obtained which had excellent adhesion to the substrate and had very good resistance to water, dilute acids and alkalis, strong alkalis, aromatic and aliphatic hydrocarbons. On exposure to an aqueous environment in the form of complete immersion in water, humidity cabinet or outdoor exposure the cured films showed excellent retention of adhesion and in this respect were superior to similar films composed of conventional uncondensed solid epoxy resins cured with this polyamide.

In place of the product of Example I the product of Example II was used with similar results.

Example V

White pigmented lacquers containing the epoxy resin/pentaerythritol condensate of Example I to polyamide ratios described in Example IV and pigmented with titanium dioxide pigment at a pigment to total resin ratio of 0.8:1 by weight showed a similar performance giving tough pigmented, films having excellent water resistance and adhesion to steel substrate, both before and after exposure to aqueous environment.

In place of the product of Example I the product of Example II was used with similar results.

Example VI

A clear lacquer was made up containing a ratio by weight of epoxy resin/pentaerythritol condensate of Example I to Versamid 100 polyamide resin of 2:1.

Versamid 100 is a polyamide resin prepared by the condensation of polymerized linoleic acid with polyamines, has an amine value of 83–93, and a melting point (ASTM 1240) of 53–54° F. according to the Cornelius Chemical Co. Technical Bulletin 11–A, dated September 1956.

On applying to steel substrates and allowing to air dry for 2–3 days tough flexible films were obtained which had very good adhesion to the substrate and very good resistance to water, dilute acids and alkalis, strong alkalis and aromatic and aliphatic hydrocarbons.

In place of the product of Example I the product of Example II was used with similar results.

Example VII

Clear lacquers were prepared from the epoxy resin/pentaerythritol adduct of Example I and Versamid 115, a polyamide resin prepared by the condensation of polymerized linoleic acid with polyamines having an amine value of 210–220 and fluid at normal temperatures according to the Cornelius Chemical Co. Technical Bulletin 11–A, dated September 1956. The range of epoxy resin polyamide resin ratios was 3:1 to 6:1 by weight. On applying to steel substrates and allowing to air dry for a period of 3–7 days, hard flexible films were obtained which had excellent adhesion to the substrate and possessed good resistance to water, dilute acids and alkalis, strong alkalis and aromatic and aliphatic hydrocarbons. On exposure to an aqueous environment in the form of complete immersion in water, humidity cabinet or outdoor exposure the cured films showed excellent retention of adhesion and in this respect were superior to similar films composed of conventional uncondensed epoxy resins cured with this polyamide resin.

In place of the product of Example I the product of Example II was used with similar results.

Example VIII

White pigmented lacquers were prepared containing the epoxy resin/pentaerythritol condensate of Example I to polyamide ratios described in Example VII and pigmented with titanium dioxide pigment at a pigment to total resin ratio of 0.8:1 by weight showed the same properties as the clear lacquers described in Example VII after exposure to aqueous environment.

In place of the product of Example I the product of Example II was used with similar results.

*Example IX*

The Epikote 828/pentaerythritol condensate of Example I was dissolved in a solvent mixture of Cellosolve, xylol and butanol and to this solution was added a quantity of diethylene triamine (Laromin A321 in the proportion of 5.5 parts of amine to 100 parts of epoxy condensate by weight. The solution was allowed to stand for 24 hours and was then applied as a film to steel substrates and allowed to air dry for seven days. After this period clear films were produced which had good hardness and flexibility, good resistance to weak acids, alkalis and organic solvents. On exposure of such films on steel substrates for 500 hours in a humidity cabinet an improvement was obtained in respect of blistering and adhesion of films to substrate over a conventional non-condensed epoxy resin, cured with the same reactive amine.

In place of the product of Example I the product of Example II was used with similar results.

Films obtained as described in Example IX above were force dried at a temperature of 120° C. for 1 hour. On exposing these films in a humidity cabinet as before and again measuring adhesion of the films after exposure, an improvement in adhesion to substrate was obtained compared with a conventional non-condensed solid epoxy resin system.

*Example X*

Example IX was repeated except that the amine used was dipropylene triamine (Laromin amine A327) and this was added in the proportion of 7 parts per 100 parts of epoxy resin condensate. Films were obtained similar in properties to those described in Example IX and again there was an improvement in adhesion to the substrate compared with a film composed of a non-condensed solid epoxide resin cured with the same amine.

Films obtained in the manner of this example were force dried for 1 hour at 120° C. After exposure in humidity cabinet for 500 hours the films showed an improvement in adhesion as compared with a conventional non-condensed solid epoxy resin cured with the same amine.

*Example XI*

Example IX was repeated using a cyclo aliphatic polyamine in place of Laromin A321. This was added to the solution in the proportion of 13 parts by weight to obtain 100 parts by weight of epoxy resin condensate. After exposure in humidity cabinet there was an improvement in adhension to the substrate compared with a conventional epoxide resin cured with the same curing agent.

Force dried films of the above system of Example XI (1 hour at 120° C.) improved adhesion to steel substrates after exposure in the humidity cabinet compared with a conventional epoxide resin cured with the same curing agent.

Ethylene diamine was used in place of the cycloaliphatic polyamine in the proportion of 4 parts per 100 parts epoxy resin with similar results.

*Example XII*

The Epikote 828/pentaerythritol condensate of Example I was dissolved in a solvent mixture of Cellosolve, xylol and butanol to give a solution of 50% solids. To this solution was added a solution of an ethylene diamine isolated adduct (EDA 870) such that the ratio of epoxy resin amine adduct was 4:1 by weight on solid resins. The EDA 870 adduct is a reactive product of Epikote 1001 (an epoxy resin marketed by the Shell Chemical Co. Ltd.) and ethylene diamine. E.D.A. adduct 870 is a chemically stable powder melting between 90 and 95° C. and free from the volatility and toxicity of the parent amine according to the Anchor Chemical Co. publication of October 1957. This lacquer when cast as clear films on steel substrates and allowed to air dry for seven days at 20° C. gave hard, glossy flexible films having good adhesion to the substrate. Such films were resistant to organic solvents and had improved adhesion to steel substrate both before and after exposure to conditions of high humidity and outdoor weathering, when compared with similar films incorporating a conventional solid epoxy resin cured with the same material. This improvement in adhesion can be obtained over a range of epoxy resin/pentaerythritol condensate to amine adduct ratios of 4:1 to 10:1.

In place of the product of Example I the product of Example II was used with similar results.

*Example XIII*

When a 50% solution of the product of Example I in Cellosolve acetate is mixed with a 50% solution of Desmodur L in a 50/50 blend of ethyl acetate and Cellosolve acetate, in such ratios that the iso-cyanate to epoxide equivalence lies between 1:1 and 0.5:1 products with a pot life of 24 to 48 hours result. When applied in thin films to steel or glass the clear or pigmented finishes give self curing films at room temperature, or alternatively can be cured at temperatures of 100° C. or above to give very adherent films with remarkably good water, alkali, acid and solvent resistance, and unimpaired adhesion after extremely long exposure to such environment.

In place of the product of Example I the product of Example II was used with simlar results.

*Example XIV*

To a solution of the epoxy resin/pentaerythritol condensate of Example I in a 1:1 mixture of Cellosolve acetate and ethyl acetate was added a solution of an isocyanate adduct having an isocyanate content equal to approximately 13% (Desmodur L 75% in ethyl acetate). The ratio of epoxy resin condensate to isocyanate was 1.2:1 based on solid resins.

Films cast from this solution when allowed to air dry for a period of 3–7 days at 20° C. were hard, glossy and had good adhesion to metallic substrates, both ferrous and non-ferrous. Such films had good solvent and chemical resistance and their water resistance was slightly superior to systems based upon unmodified solid epoxy resins such as Epikote 1009 cured with the same isocyanate.

In place of the product of Example I the product of Example II was used with similar results.

*Example XV*

A white pigmented lacquer was prepared by the method of Example XIV containing titanium dioxide in the proportion of 0.8 part by weight of $TiO_2$ to 1 part of total resin solds. This gave films of good gloss and hardness and the resistance properties were identical to those of the clear lacquer.

*Example XVI*

A clear lacquer containing a ratio of epoxy resin/ pentaerythritol condensate of Example I to isocyanate adduct of Example XIV of 1.8:1 by weight on solid resins gave films which when force dried for a period of 30 minutes at temperatures in the range 120° C.–150° C. had good gloss, hardness and adhesion to metallic substrates and very good chemical, solvent and water resistance.

In place of the product of Example I the product of Example II was used with similar results.

Example XVII

A pigmented lacquer was prepared in a similar manner to the method of Example XVI containing titanium dioxide in the proportion of 0.8 part by weight $TiO_2$ to 1 part total resin solids. This lacquer gave films of good gloss, hardness and adhesion with very good chemical, solvent and water resistance.

Example XVIII

Example XIV was repeated utilising an isocyanate adduct having an isocyanate content of 19% calculated as —NCO on the solid resin. The epoxy resin/pentaerythritol condensate: isocyanate adduct ratio was 1.3:1 based on solid resins. Film properties obtained were the same as those described in Example XVII.

Example XIX

A pigmented lacquer was made up by the process described in Example XV utilising the isocyanate of Example XVIII was prepared and this had identical resistance properties to the clear lacquer described in Example XVIII.

Examples XX and XXI

Examples XVI and XVII were repeated utilising the isocyanate of Example XVIII at an epoxy resin/isocyanate ratio of 2:1 based on solid resins. Film properties were similar to those described in Examples XVI and XVII.

Example XXVI

A white pigmented lacquer was prepared containing the epoxy resin/pentaerythritol condensate of Example I and an aliphatic isocyanate, adduct having an isocyanate content of 15–16% (Desmodur N), in the ratio of 1.3:1 on solid resins. Desmodur N is a high molecular weight non-yellowing polyisocyanate. The —NCO content of a 75% solution is 15–16% according to the Farbenfabriken Bayer A.G. Information Sheet dated Jan. 10, 1961. The pigment was titanium dioxide and the pigment resin solids ratio was 0.8:1 by weight. Films cast from this lacquer, on air drying for 3–7 days at 20° C., were hard, glossy and had good colour retention on exposure to outdoor weathering. Such films had good adhesion to metallic substrates both ferrous and non-ferrous.

In place of the product of Example I the product of Example II was used with similar results.

Example XXIII

Clear lacquers were prepared containing the epoxy resin/pentaerythritol condensate of Example I and an isocyanate adduct of a type which is only reactive at temperatures of 150° C. or above. The adducts used were (a) Isocyanate adduct—11% —NCO on solid resin.
(b) Desmodur AP Stable (a phenol stopped Desmodur L), 12% NCO on solid resin. Desmodur AP Stable is a phenol stopped polyisocyanate, the polyisocyanate being the reaction product of tolylene di-isocyanate with a trihydric alcohol according to Farbenfabriken Bayer A.G. publication entitled Desmodur/Desmophen for Polyurethane Coatings dated Jan. 3, 1960.

In either case the epoxy resin isocyanate ratio was 1.5:1 on solid resins.

Films cast from these lacquers on force drying at a temperature of 175–180° C. produced finishes having a high degree of hardness and very good solvent, chemical and water resistance.

In place of the product of Example I the product of Example II was used with similar results.

Example XXIV

White pigmented lacquers were made up by the method of Example XXIII having a ratio of titanium dioxide pigment total resin solids of 0.8:1. These lacquers gave white finishes possessing good gloss, very good hardness and good chemical solvent and water resistance properties.

We claim:

1. A process for the production of a modified epoxy resin which comprises the steps of heating an epoxide resin having an epoxide equivalent in the range of 190 to 210 and having terminal epoxide groups with pentaerythritol in proportions such that there are at least two epoxide groups for each hydroxyl group of the pentaerythritol to a temperature in the range of 180° C. to 230° C. for a period of at least 5 hours and cooling the product so formed, the modified resin produced thereby having an epoxy equivalent which is not more than 850 and a hydroxy equivalent not in excess of 240.

2. A process as defined in claim 1 wherein the epoxide resin that is heated has an epoxide equivalent in the range of 190 to 210 and the modified epoxide resin that is produced has an epoxide equivalent in the range of 400 to 450 and a hydroxyl equivalent in the range of 210 to 240.

3. A process for the production of a modified epoxide resin as defined in claim 1 wherein the epoxide resin has the formula:

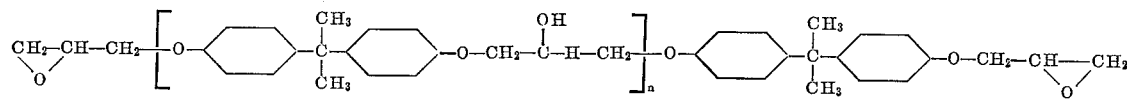

wherein $n$ is an integer selected from 1 and 2.

4. The method as defined in claim 1 wherein the epoxide is the reaction product of epichlorohydrin and p,p'-dihydroxy diphenyl dimethyl methane at a pH greater than 7 and is heated for a period of 12 to 14 hours at a temperature of 180° C. to 230° C.

5. The product produced according to the method of claim 1.

6. A coating composition comprising at least one reactive compound selected from the group consisting of diisocyanates, diisocyanate polyhydric alcohol adducts, interreaction of polymeric fatty acids and polyamines and a modified epoxide resin, obtained by a process which comprises the steps of heating an epoxide resin having an epoxide equivalent in the range of 190 to 210 and having terminal epoxide groups with pentaerythritol in proportions such that there are at least two epoxide groups for each hydroxyl group of the pentaerythritol to a temperature in the range of 180° C. to 230° C. for a period of at least 5 hours and cooling the product so formed, the modified epoxide resin so produced having an epoxide equivalent of not more than 850 and a hydroxyl equivalent of 210 to 240.

7. The coating composition as defined in claim 6 wherein the ratio of epoxide resin to reactive compound is in the range of 3:1 to 6:1.

8. The coating composition as defined in claim 6 wherein the reactive compound is an aromatic diisocyanate.

9. The coating composition as defined in claim 6 wherein the epoxide resin has an epoxide equivalent of 190 to 210 and has terminal epoxide groups and is the reaction product of epichlorohydrin and p,p'-dihydroxydiphenyl dimethyl methane at a pH greater than 7 and is heated for 12 to 14 hours at a temperature of 180° C. to 230° C. to produce a modified resin having an epoxide equivalent of 400 to 450 and a hydroxyl equivalent of 210 to 240.

10. An inert metal substrate coated on at least one surface thereof with a coating composition defined in claim 6.

11. A process for the protection of the surface of an inert solid substrate which comprises applying thereto the coating composition as defined in claim 6 and curing the coating on the substrate.

References Cited

UNITED STATES PATENTS 2,731,444  1/1956  Greenlee _____ 260—18 X

OTHER REFERENCES

Official Digest, 1960, vol. 32, Glaser et al., pp. 108–118, 121, 123, 124, 133, 134.

DONALD E. CZAJA, *Primary Examiner.*

LEON J. BERCOVITZ, *Examiner.*

C.W. IVY, *Assistant Examiner.*